United States Patent
Lieu et al.

(10) Patent No.: US 6,708,045 B1
(45) Date of Patent: Mar. 16, 2004

(54) EASILY RECONFIGURED AND UPGRADED RADIO CARD AND WIRELESS TERMINAL

(75) Inventors: Winston Hong Lieu, Holmdel, NJ (US); Cheng Wang, Belle Mead, NJ (US); David Kiley, Brick, NJ (US); Charles Chia-Yi Pai, Cupertino, CA (US)

(73) Assignee: Mobicom, Inc., Holmdel, NJ (US)

( * ) Notice: Subject to any disclaimer, the term of this patent is extended or adjusted under 35 U.S.C. 154(b) by 0 days.

(21) Appl. No.: 09/545,228

(22) Filed: Apr. 7, 2000

(51) Int. Cl.[7] .............................. H04B 1/38; H04M 1/00
(52) U.S. Cl. ...................... 455/557; 455/418; 455/558
(58) Field of Search .......................... 455/550.1, 557, 455/558, 418, 419, 420; 348/14.01

(56) References Cited

U.S. PATENT DOCUMENTS

| | | | | |
|---|---|---|---|---|
| 5,812,953 A | * | 9/1998 | Griffith et al. | 455/558 |
| 5,926,756 A | * | 7/1999 | Piosenka et al. | 455/418 |
| 5,974,311 A | * | 10/1999 | Lipsit | 455/418 |
| 6,131,040 A | * | 10/2000 | Knuutila et al. | 455/550.1 |
| 6,243,589 B1 | * | 6/2001 | Novel | 455/558 |
| 6,268,879 B1 | * | 7/2001 | Sato | 348/14.01 |
| 6,271,865 B1 | * | 8/2001 | Yu et al. | 455/557 |
| 6,349,224 B1 | * | 2/2002 | Lim | 455/557 |
| 6,567,674 B1 | * | 5/2003 | Fujiwara | 455/557 |

* cited by examiner

*Primary Examiner*—Quochien B. Vuong
(74) *Attorney, Agent, or Firm*—DeMont & Beyer, LLC (57) ABSTRACT

A wireless terminal is described whose software are more easily upgradable than many in the prior art. Furthermore, the first illustrative embodiment of the present invention is an arrangement in which a user can easily: (1) upgrade the software in a wireless terminal, (2) change the parameters affecting the operation of the wireless terminal, (3) enable and disable features and options on the wireless terminal, (4) install software modules onto the wireless terminal and remove them, (5) reconfigure the reconfigurable hardware on the wireless terminal, (6) extract performance data from the wireless terminal for analysis and testing of the wireless terminal, and (7) load contact information (e.g., names and associated telephone numbers, etc.) onto the wireless terminal. Furthermore, the user can easily do any of these functions in the field, himself or herself, without having to visit, or send the wireless terminal to, an authorized service facility.

40 Claims, 5 Drawing Sheets

EASILY RECONFIGURED AND UPGRADED RADIO CARD AND WIRELESS TERMINAL

FIELD OF THE INVENTION

The present invention relates to wireless telecommunications in general, and, more particularly, to both a radio card and a wireless terminal that are easily reconfigured and upgraded.

BACKGROUND OF THE INVENTION

As time progresses, more and more people are discovering and appreciating the advantages that wireless terminals (e.g., cellular telephones, pagers, computers with wireless modems, etc.) provide over their traditional wireline counterparts. In general, there are two principal advantages of wireless terminals with respect to wireline terminals. The first advantage is the mobility that is afforded to the user of a wireless terminal because the wireless terminal need not be tethered in order to have a telecommunications link. The second advantage is the fact that wireless terminals largely obviate the need for in-building wiring and cabling, which is expensive and difficult to install. This last advantage is true whether the wireless terminal is portable or not. In fact, it is becoming increasingly popular to link desktop computers and other less-than-easily portable machines with wireless technologies rather than traditional wired solutions.

Although most cellular telephones and pagers are manufactured with fully-integrated and permanently installed radios that are manufactured to operate in accordance with one or more air interfaces (e.g., 800 MHz IS-41 AMPS, 800 MHz IS-54 TDMA, 800 MHz IS-95 CDMA, 800 MHz IS-95 GSM, etc.), it is generally considered disadvantageous and uneconomical for computers, personal digital assistants, and some other wireless terminals to be manufactured with a permanently installed radio. There are several reasons for this disparity. First, many computer users don't want a radio in their computer at all, and, therefore, don't want to pay for a radio that they have no intention of using. Second, for those users who do want a radio in their computer, there is a great diversity in the type of radios that they might want. For example, some users might want a radio that transmits and receives voice and data at the 1800 MHz IS-95 PCS standard, others might want a radio that transmits and receives data only at the 2400 MHz Bluetooth standard, and some might want a radio that transmits and receives voice only at the 800 MHz IS-41 AMPS standard. Therefore, the permanent installation of a radio into a computer that is suitable for one user is most likely to be unsuitable for another.

To deal with this dilemma, many manufacturers have adopted a modular approach in which a host device (e.g., a computer, a personal digital assistant, etc.) comprises a slot or bay with a standardized form factor and standardized wireline electrical interface that accepts and interoperates with a separately manufactured radio. In general, the mechanical and electrical engineering are such that it is quick and easy for a user to insert the radio into the host device and to remove it as desired. The modular approach to this dilemma is advantageous because it enables a user to buy one host device, to separately buy one or more radios that are suitable for the user's needs, and to insert the appropriate radio into the host device as appropriate.

Figure 1:
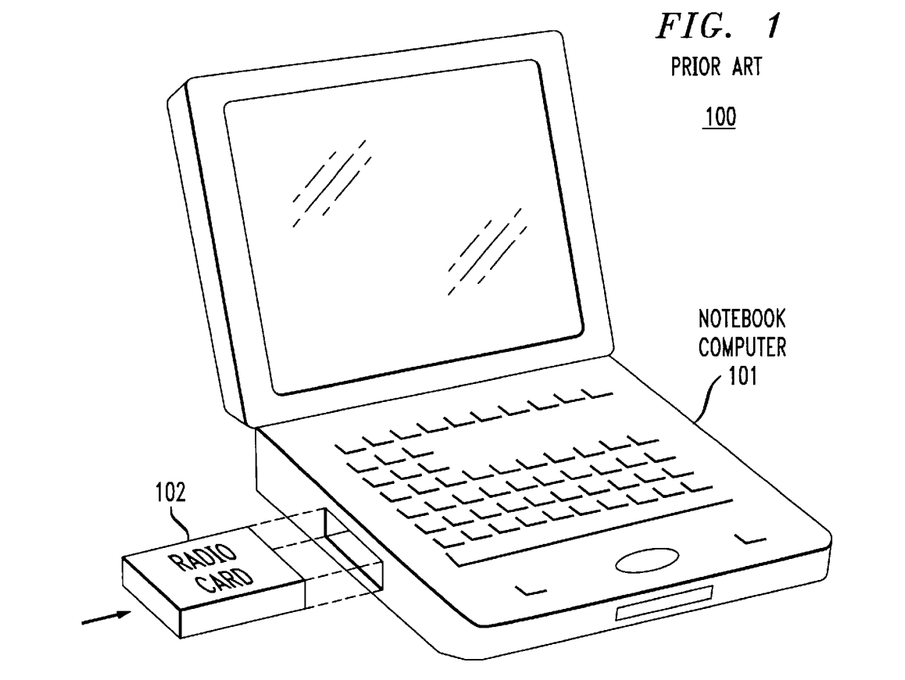
FIG. 1 depicts an isometric drawing of the spatial relationship of a PCMCIA radio card to a notebook computer with a PCMCIA card interface, in the prior art, as the radio card is being inserted into the computer.

The most popular of these modular approaches is defined by the well-known Personal Computer Memory Card Industry Association (hereinafter "PCMCIA" or "PC Card") card interface, in which the radios resemble a thick credit card. Although some PC Cards function as radios, other PC Cards are available that function as: modems, hard drives, Ethernet cards, and flash memory. FIG. 1 depicts an isometric drawing, in the prior art, of the spatial relationship of a PCMCIA radio card to a notebook computer with a PCMCIA card interface as the radio card is being inserted into the computer.

One disadvantage of radio cards in the prior art is that it is difficult, if not impossible, to upgrade their software when a bug is discovered or when a new software release is available. Therefore, the need exists for a radio card whose software is easily upgradable.

SUMMARY OF THE INVENTION

The first illustrative embodiment of the present invention is a radio card whose software is more easily upgradable than many radio cards in the prior art. Furthermore, the first illustrative embodiment of the present invention is an arrangement in which a user can easily: (1) upgrade the software in a radio card, (2) change the parameters affecting the operation of the radio card, (3) enable and disable features and options on the radio card, (4) install software modules onto the radio card and remove them, (5) reconfigure the reconfigurable hardware on the radio card, (6) extract performance data from the radio card for analysis and testing of the radio card, and (7) load contact information (e.g., names and associated telephone numbers, Internet addresses, etc.) onto the radio card. Furthermore, the user can easily do any of these functions in the field, himself or herself, without having to visit, or send the radio card to, an authorized service facility To accomplish this, the first illustrative embodiment of the present invention exploits the cooperative relationship that exists between a radio card and a computer with a radio card interface. When the radio card is designed and manufactured with an alterable memory for storing data and software, the computer can be used to easily upgrade and change the data and software on the radio card. Furthermore, if the radio card comprises reconfigurable hardware (e.g., a field-programmable gate array, etc.) whose components are interconnected in a topology that is determined by information provided to the reconfigurable hardware (i.e., a "hardware definition") and stored in an alterable memory, then the computer can be used to easily reconfigure the reconfigurable hardware by altering the hardware definition stored in the alterable memory. This is advantageous because it facilitates major changes in the functionality provided by the radio card (e.g., from an 800 MHz IS-41 cellular card to a 2400 MHz Bluetooth data card, etc.).

A further advantage of the first illustrative embodiment of the present invention is that when the computer is connected to a data network (e.g., the Internet, etc.), software upgrades, software modules, hardware definitions, and other data can be downloaded from the data network for installation into the radio card. For example, if a particular radio card does not support caller ID, the user of the radio card can download the caller ID software module from the Internet and install it into the radio card to enable the radio card to support caller ID.

And yet another advantage of the first illustrative embodiment of the present invention is that performance data can be extracted from the radio card for analysis and testing of the radio card, and the testing and analysis can be performed either: (1) by the computer itself, or (2) by transmitting the performance data via a data network for analysis by a remote computer system, or (3) by a combination of the two.

The first illustrative embodiment of the present invention comprises:

(1) a radio card comprising:
  (a) a first alterable memory for storing a first plurality of instructions, and
  (b) a radio comprising programmable logic that executes the first plurality of instructions, and
(2) a computer comprising:
  (a) a wireline connection to a data network for receiving the first plurality of instructions via the data network, and
  (b) a wireline radio card interface for providing the first plurality of instructions to the radio card for storage in the first alterable memory.

The second illustrative embodiment of the present invention is a wireless terminal whose software is more easily upgradable than many wireless terminals in the prior art. Furthermore, the second illustrative embodiment of the present invention is an arrangement in which a user can easily: (1) upgrade the software in a wireless terminal, (2) change the parameters affecting the operation of the wireless terminal, (3) enable and disable features and options of the wireless terminal, (4) install software modules into the wireless terminal and remove them, (5) reconfigure the reconfigurable hardware in the wireless terminal, (6) extract performance data from the wireless terminal for analysis and testing of the wireless terminal, and (7) load contact information (e.g., names and associated telephone numbers, Internet addresses, etc.) into the wireless terminal. Furthermore, the user can easily do any of these functions in the field, himself or herself, without having to visit, or send the wireless terminal to, an authorized service facility.

To accomplish this, the second illustrative embodiment of the present invention exploits the cooperative relationship that can exist between a wireless terminal and a computer with either: (1) a wireline interface (e.g., a serial interface, a parallel interface, etc.), or (2) a wireless interface (e.g., an infrared interface, etc.), or (3) both #1 and #2. When the wireless terminal is designed and manufactured with an alterable memory for storing data and software, the computer can be used to easily upgrade and change the data and software in the wireless terminal. Furthermore, if the wireless terminal comprises reconfigurable hardware (e.g., a field programmable gate array, etc.) whose components are interconnected in a topology that is determined by a hardware definition and stored in an alterable memory, then the computer can be used to easily configure the reconfigurable hardware by altering the hardware definition in the alterable memory. This is advantageous because if facilitates major changes in the functionality provided by the wireless terminal.

A further advantage of the second illustrative embodiment of the present invention is that when the computer is connected to a data network (e.g., the Internet, etc.), software upgrades, software modules, hardware definitions, and other data can be downloaded from the data network for installation into the wireless terminal.

And yet another advantage of the second illustrative embodiment of the present invention is that performance data can be extracted from the wireless terminal for analysis and testing of the wireless terminal, and the testing and analysis can be performed either: (1) by the computer itself, or (2) by transmitting the performance data via a data network for analysis by a remote computer system, or (3) by a combination of the two.

DETAILED DESCRIPTION

Figure 2:
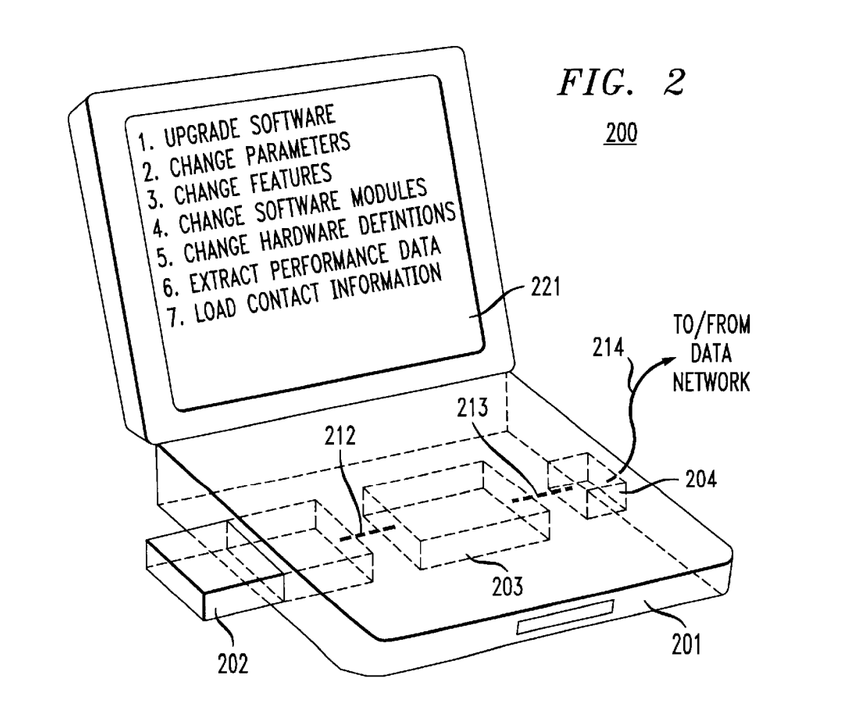
FIG. 2 depicts an isometric drawing of the first illustrative embodiment of the present invention.

FIG. 2 depicts an isometric drawing of the salient components of the first illustrative embodiment of the present invention, 200, which comprises: computer 201, radio card 202, processor 203, modem 204, wireline radio card interface 212, modem interface 213, modem 214, and display 221, interconnected as shown.

Computer 201 is a notebook computer, as is well-known in the art, and provides the functionality described in this specification and in the drawings. Although only the wire frame and some components of computer 201 are depicted in FIG. 2, computer 201 advantageously also comprises: a keyboard, a pointing device for a graphical user interface (e.g., a mouse, a touchpad, etc.), a CD-ROM/DVD drive, a power supply, a hard drive, a speaker, and a microphone, in well-known fashion. Because these components are all well-known to those skilled in the art, they are not shown in FIG. 2 so that the following discussion can focus on those components that are most germane to an understanding of the present invention.

Furthermore, although computer 201 is depicted in FIG. 2 as having a clamshell-notebook design, it will be clear to those skilled in the art that, in some alternative embodiments of the present invention, the size, shape, and weight of computer 201 can vary considerably and can include, for example, but without limitation, a hand-held design, a tower design, a desktop design, etc.

The heart of computer 201 is processor 203, which is advantageously a general purpose processor that is capable of directing computer 201 to perform the functionality described in this specification and in the drawings. For example, processor 203 is capable of receiving data, hardware definitions, software, software modules (e.g., .dll files, etc.), contact information, etc. from a data network via modem 214 and modem interface 213 and transmitting to radio card 202 via wireline radio card interface 212, under the direction of a user of computer 201. In addition, processor 203 is capable of receiving data, hardware definitions, software, software modules (e.g., .dll files, etc.), contact information, etc. from a media (e.g., a CD-ROM, a magnetic disk, non-volitale RAM, etc.) and transmitting to radio card 202 via wireline radio card interface 212, under the direction of a user of computer 201. Furthermore, processor 203 is capable of receiving data, hardware definitions, software, software modules, contact information, performance data, etc., from radio card 202 via wireline radio card interface 212 and transmitting it to a data network via modem 214 and modem interface 213, under the direction of a user of computer 201. It will be clear to those skilled in the art how to make and use processor 203.

Computer 201 advantageously comprises wireline radio card interface 212 that is compliant with the Personal Computer Memory Card Industry Association (hereinafter "PCMCIA" or "PC Card") standard interface for mechanically and electrically interfacing with radio card 202. In some alternative embodiments of the present invention, computer 201 comprises a non-PC Card standard electrical and mechanical interface for interfacing with radio card 202. Furthermore, in some alternative embodiments of the present invention, radio card 202 electrically and mechanically interfaces with computer 201 without any portion of it being within computer 201. Radio card 202 can transmit information to and receive information from processor 203 via wireline radio card interface 212. It will be clear to those skilled in the art how to make and use wireline radio card interface 212.

Computer 201 also advantageously comprises modem 204, which provides a connection, in well-known fashion, to a data network, such as the Internet, a local area network, a wide area network, etc. In particular, modem 204 enables computer 201 to receive information (e.g., data, hardware definitions, software, software modules, contact information, etc.) reliably from other computers via the data network and to reliably transmit data to other computers via the data network. The connection between modem 204 and the data network can be a wireline connection, wireless connection or combination of wireline and wireless connections. It will be clear to those skilled in the art how to make and use modem 204.

Radio card 202 comprises a radio and a wireline radio card interface 212 that advantageously corresponds to the Personal Computer Memory Card Industry Association (hereinafter "PCMCIA" or "PC Card") standard. In some alternative embodiments of the present invention, radio card 102 has a non-PC Card form factor and a non-PC Card compatible wireline radio card interface. In whichever case, after reading this disclosure it will be clear to those skilled in the art how to make and use radio card 102 with any form factor and any wireline radio card interface.

Display 221 is a liquid crystal display, as is well-known in the art, and aids the user of computer 201 in working with radio card 202 via computer 201. It will be clear to those skilled in the art how to make and use display 221.

Figure 3:
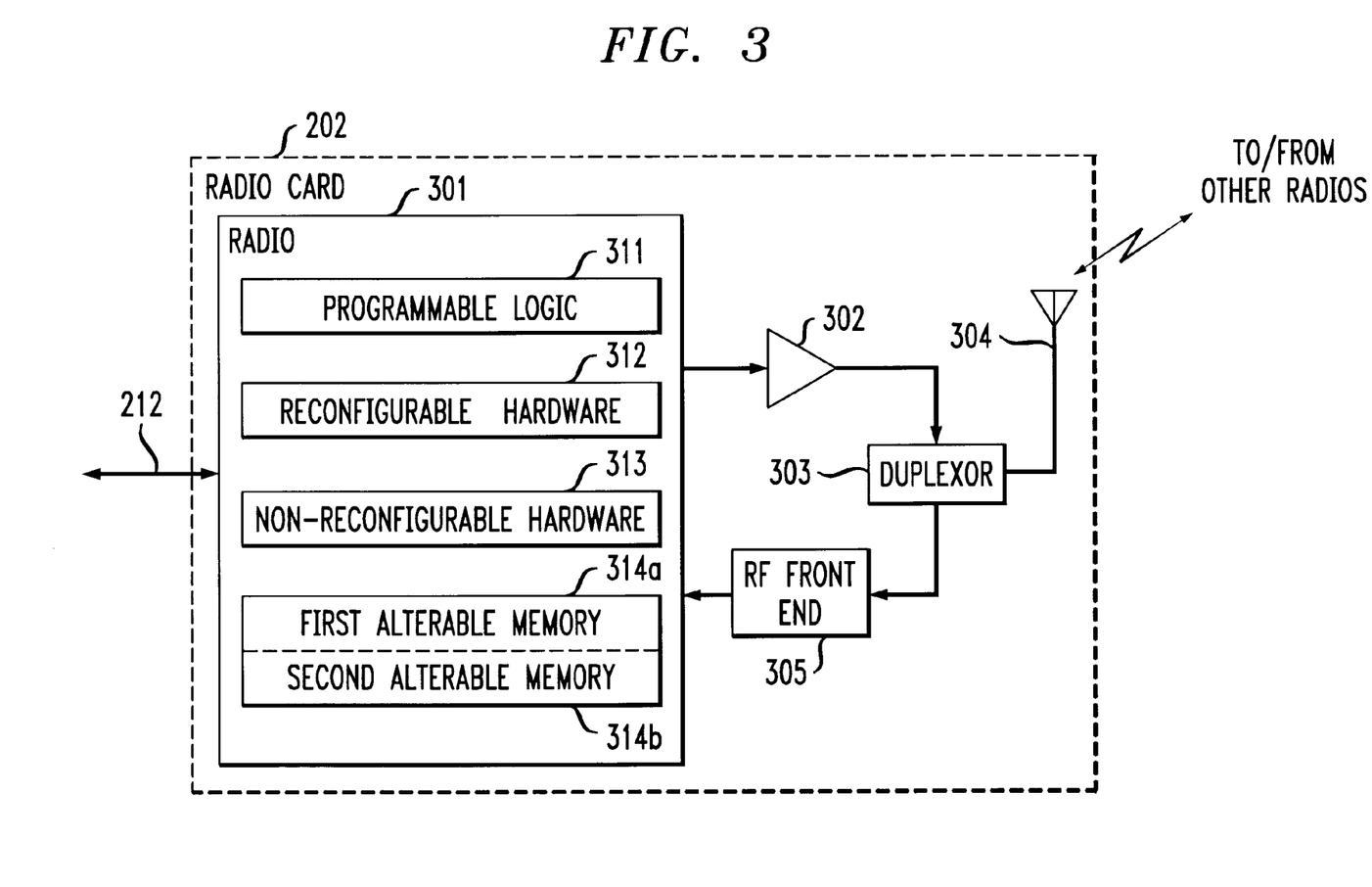
FIG. 3 depicts a block diagram of some of the components in radio card 202, which is depicted in FIG. 2.

FIG. 3 depicts a block diagram of the components in radio card 202. Radio card 202 advantageously comprises: radio 301, radio frequency amplifier 302, duplexor 303, antenna 304, RF front end 305, and wireline radio card interface 212.

Radio frequency amplifier 302, duplexor 303, antenna 304, RF front end 305, and wireline radio card interface 312 are all well known to those skilled in the art and need not be discussed further.

Radio 301 comprises all of the hardware and software necessary or desirable to receive signals via wireline radio card interface 312 and to prepare them for transmission via antenna 304 and to receive signals via antenna 304 and to prepare them for transmission via wireline radio card interface 312. Radio 301 advantageously comprises: programmable logic 311, reconfigurable hardware 312, non-reconfigurable hardware 313, first alterable memory 314a and second alterable memory 314b, which can: (1) comprise one or more individual semiconductor devices, and (2) can be mapped into either one or two memory spaces.

The wireless interface (ie., all of the characteristics that define the signals transmitted by, and received by, radio 301) of radio 301 is advantageously flexible, and is, at any one time determined by programmable logic 311, reconfigurable hardware 312, non-reconfigurable hardware 313, and the instructions, data and hardware definition stored in first alterable memory 314a and second alterable memory 314b. In other words, the fundamental nature of radio 301, as well as its specific features and parameters, is advantageously alterable.

Programmable logic 311 is hardware (e.g., a microprocessor, a microcontroller, etc.) that executes a plurality of instructions (i.e., software) stored in first alterable memory 314a. Because the nature of radio 301 depends, at least in part, on the nature of the instructions stored in first alterable memory 314a, radio 301 can be changed, for example, from a time-division multiple access wireless terminal to a code-division multiple access wireless terminal, completely or in part, by changing the nature of the instructions stored in first alterable memory 314a. Furthermore, the instructions stored in first alterable memory 314a can be upgraded at any time via wireline radio card interface 312. It will be clear to those skilled in the art how to make and use programmable logic 311 and first alterable memory 314a. Furthermore, it will be clear to those skilled in the art how to make and use software for programmable logic 311 and how to download them from computer 201 into first alterable memory 314a.

Reconfigurable hardware 312 is a set of analog or digital hardware components (e.g., capacitors, resistors, NAND gates, multiplexors, etc.) or both that are interconnected into a circuit in accordance with a hardware definition stored in second alterable memory 314b. For example, reconfigurable hardware 312 could comprise a field programmable gate array, as is well-known to those skilled in the art. For example, reconfigurable hardware 312 can perform one function (e.g., a reed-solomon decoder, a multiplier, etc.) at one time in accordance with one hardware definition stored in second alterable memory 314b, and can, perform an entirely different function (e.g., a modulator, a signal strength analyzer, etc.) at another time in accordance with a different hardware definition. Therefore, the function performed by reconfigurable hardware 312 is defined by the hardware definition stored in second alterable memory 314b, and can be changed or upgraded at any time via wireline radio card interface 312. It will be clear to those skilled in the art how to make and use reconfigurable hardware 312 and second alterable memory 314b. Furthermore, it will be clear to those skilled in the art how to make and use hardware definitions for reconfigurable hardware 312 and how to download them from computer 201 into second alterable memory 314b.

One way of understanding a difference between programmable logic 311 and reconfigurable hardware 312 is by understanding that the topology of the hardware components in programmable logic 311 is fixed, regardless of the instructions in first alterable memory 314a, whereas the topology of the hardware components in reconfigurable hardware 312 is not fixed, but is determined by the hardware definition stored in second alterable memory 314b. Furthermore, the functionality provided by programmable logic 311 is controlled by software in first alterable memory 314a, whereas the functionality provided by reconfigurable hardware 312 is determined by the inherent nature of the components in reconfigurable hardware 312 and their interconnected topology, which is itself determined by the hardware definition in second alterable memory 314b.

Because every radio, regardless of the frequencies, modulation schemes, and access technology used all have some common components (e.g., a power supply and power regulator, etc.), radio 301 also comprises non-reconfigurable hardware 313. Non-reconfigurable hardware 313 can perform either analog or digital functions and is fixed. It will be clear to those skilled in the art how to make and use non-reconfigurable hardware 313.

It will be clear to those skilled in the art how to make and use programmable logic 311, reconfigurable hardware 312, non-reconfigurable hardware 313, first alterable memory 314a and second alterable memory 314b so that they cooperate to provide all of the necessary and desirable functionality of radio 301.

Figure 4:
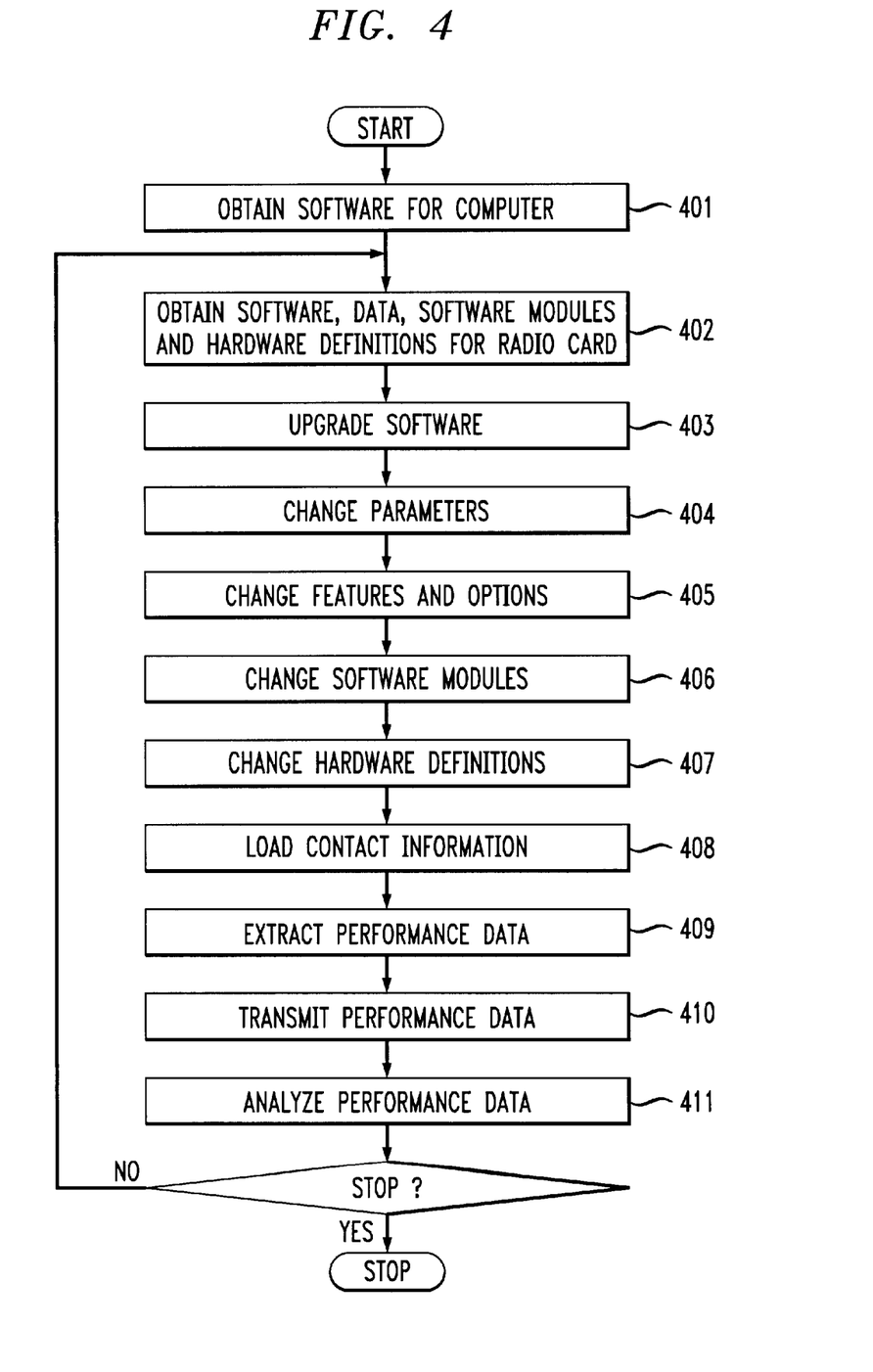
FIG. 4 depicts a flowchart of the operation of the illustrative embodiment of the present invention.

FIG. 4 depicts a flowchart of the steps performed by the first illustrative embodiment of the present invention.

At step 401, application software for computer 201 is obtained either: (i) by downloading it from a data network and via modem 204, or (ii) by loading it into computer 201 off of a CD-ROM, magnetic disk, or other removable medium. This software enables computer 201 to work with a user of computer 201 to: (1) upgrade the software in radio card 201, (2) enable and disable the parameters affecting the operation of radio card 201, (3) enable and disable features and options on radio card 201, (4) install software modules onto radio card 201 and remove them, (5) reconfigure the reconfigurable hardware on radio card 201, (6) extract performance data from radio card 201 for analysis and testing, and (7) load contact information (e.g., names and associated telephone numbers, etc.) onto radio card 201. In the first illustrative embodiment of the present invention, the manufacturer of radio card 202 ships a CD-ROM with radio card 202 that enables a user of radio card 202 to perform the above functions. As part of step 401, the application software for computer 201 is executed, which might assist in the performance of step 402, and which enables computer 201 to perform steps 403 to 411. It will be clear to those skilled in the art how to perform step 401.

At step 402, software, data, hardware definitions, software modules, and contact information for downloading onto radio card 202 are obtained. Advantageously, these items can be obtained either: (i) by downloading it from a data network and via modem 204, or (ii) by loading it into computer 201 off of a CD-ROM, magnetic disk, or other removable medium. In the first illustrative embodiment of the present invention, the manufacturer of radio card 202 makes available, via the Internet, software upgrades, hardware definitions, data and software modules for owners of radio cards like radio card 202. It will be clear to those skilled in the art how to perform step 402.

At step 403, the software in first alterable memory 314a is upgraded, when necessary or desirable, with that obtained in step 402. This step is advantageously performed by a user of computer 201 when an upgrade of the software on radio card 202 becomes available, or when the user of radio card 202 desires to fundamentally change the nature of radio card 202 (e.g., from a frequency-division multiple access voice cellular radio to a time-division multiple access local area network data radio, etc.). It will be clear to those skilled in the art how to perform step 403.

At step 404, parameters affecting the operation of radio card 202 are advantageously changed, if necessary or desirable. For example, when radio card 202 performs the functionality of an AMPS cellular telephone, the parameters that can be changed include, without limitation:

1. the choice of number of assignment module (i.e., "NAM");
2. the acceptable system settings (e.g., "A only," "B only," "A then B," "B then A," etc.);
3. the telephone numbers associated with each speed dial button; and
4. changing the alerting options (e.g., enable audible alerting, disable audible alerting, enable escalating audible altering (in which successive rings get louder), etc.).

It will be clear to those skilled in the art how to perform step 404.

At step 405, features and options on radio card 202 are advantageously changed, if necessary or desirable. For example, when radio card 202 performs the functionality of an AMPS cellular telephone, the features and options that can be changed include, without limitation:

1. enabling and disabling caller ID;
2. enabling and disabling radio card 202 to accept and store voice mail;
3. enabling and disabling radio card 202 to receive and transmit short data messages; and
4. enabling and disabling speed dialing.

If radio card 202 is not equipped to perform one of these features or options, then in step 406, the appropriate software module for that feature or option can be installed into radio card 202. It will be clear to those skilled in the art how to perform step 405.

At step 406, software modules are advantageously added to radio card 202, or removed, as necessary or desirable, to enable radio card 202 to perform various features and options. As stated above with respect to step 402, the software modules are advantageously obtained over the Internet, over a data network, or from a medium such as a CD-ROM or floppy disk. It will be clear to those skilled in the art how to perform step 406.

At step 407, hardware definitions are advantageously added to second alterable memory 314b in radio card 202, or removed, as necessary or desirable, to enable reconfigurable hardware 312 to function as desired. As stated above with respect to step 402, the hardware definitions are advantageously obtained over the Internet, over a data network, or from a medium such as a CD-ROM or floppy disk. It will be clear to those skilled in the art how to perform step 407.

At step 408, contact information is advantageously added to radio card 202, or removed, as necessary or desirable, to enable the user of radio card 202 to have available to them information about people, their telephone, fax and pager numbers, their addresses, etc. It will be clear to those skilled in the art how to perform step 408.

At step 409, performance data is advantageously extracted from radio card 202 to facilitate the testing and analysis of radio card 202, wireline radio card interface 212, and the other radios that interact with radio card 202. Illustrative performance data might include, but is not limited to:

1. average bit error rate in the last 24 hours;
2. the bit error rate for each minute of each call in the last hour;
3. the average transmitted power level for the last call made;
4. the average received power level for the last call made; and
5. the identity of the radio with which the last call was made.

Quite simply, the salient characteristic of the performance data is that it is any information that might assist in the testing and analysis of radio card 202, wireline radio card interface 212 and any other radios that interact with radio card 202. It will be clear to those skilled in the art how to make and use radio card 202 to provide such performance data, and it will also be clear to those skilled in the art how to perform step 408.

Because the performance data that is extracted from radio card 202 in step 409 can be processed and analyzed remotely, as well as locally by computer 201, at step 410 the performance data is transmitted by computer 201, via modem 204, wireline data connection 214 and a data network to a remote computer for analysis. Perhaps, the remote computer is operated by the manufacturer of radio card 202, or perhaps by the operator of the wireless system that radio card 202 uses. It will be clear to those skilled in the art how to perform step 410.

At step 411, the performance data extracted from radio card 202 in step 409 is analyzed, either on computer 201 or on a remote computer, in well-known fashion, to provide some indication of how well radio card 202 is performing. One result of the analysis might be that changes might be necessary or desirable to radio card 202 to improve its performance, and these changes might be made as described in steps 402 through 408 above. By monitoring the performance of radio card 202, and by upgrading and reconfiguring it as necessary or desirable, the long term performance of radio card 202 can be enhanced. It will be clear to those skilled in the art how to perform step 411.

After step 411 is performed, the process can stop if the user desires, or it can return to step 402 if the user desires to upgrade or reconfigure radio card 202 for any reason. It will be clear to those skilled in the art that many of the steps depicted in FIG. 4 can be performed in parallel, or in reverse order, or not at all, as the user deems necessary or desirable.

Figure 5:
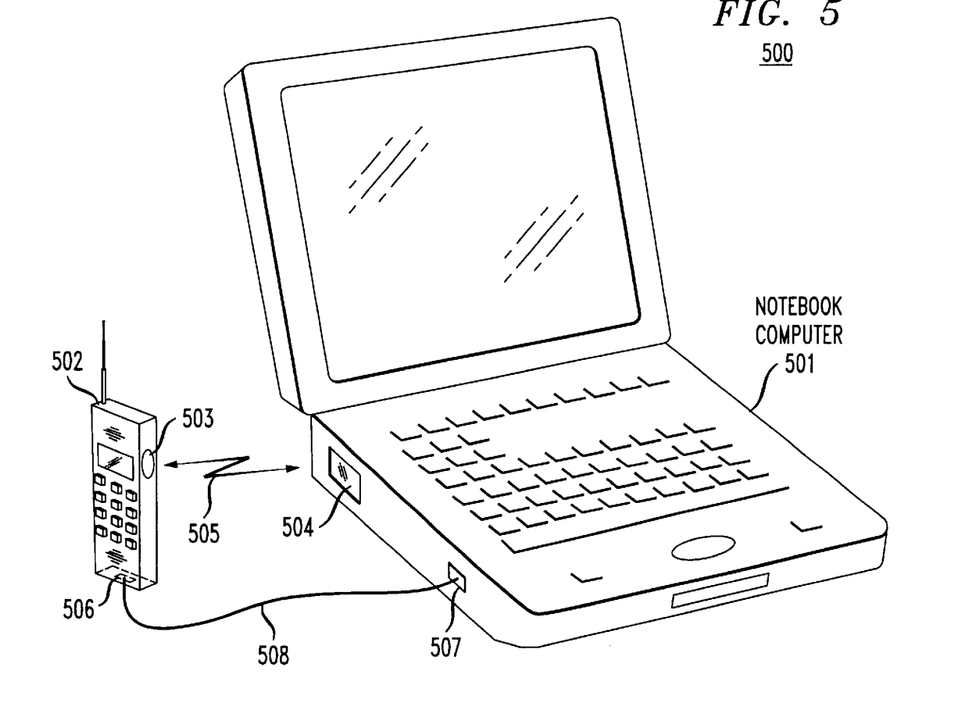
FIG. 5 depicts an isometric drawing of the salient components of the second illustrative embodiment, which comprises a wireless terminal that interfaces with a notebook computer via: (1) a wireless interface, or (2) a wireline interface, or (3) both a wireless interface and a wireline interface.

FIG. 5 depicts an isometric drawing of the salient components of the second illustrative embodiment in which wireless terminal 502 interfaces with notebook computer 501 via: (1) a wireless interface (e.g., an infrared transceiver, etc.), or (2) a wireline interface, or (3) both a wireless interface and a wireline interface. Wireless terminal 502 advantageously comprises: infrared transceiver 503 and wireline transceiver 506. Notebook computer 501 advantageously comprises: infrared transceiver 504 and wireline transceiver 507. Infrared transceiver 503 and infrared transceiver 504 communicate bi-directionally via infrared electromagnetic radiation, and wireline transceiver 506 and wireline transceiver 507 communicate bi-directionally via cable 508. It will be clear to those skilled in the art how to make and use infrared transceiver 503, infrared transceiver 504, wireline transceiver 506, wireline transceiver 507, and cable 508.

Figure 6:
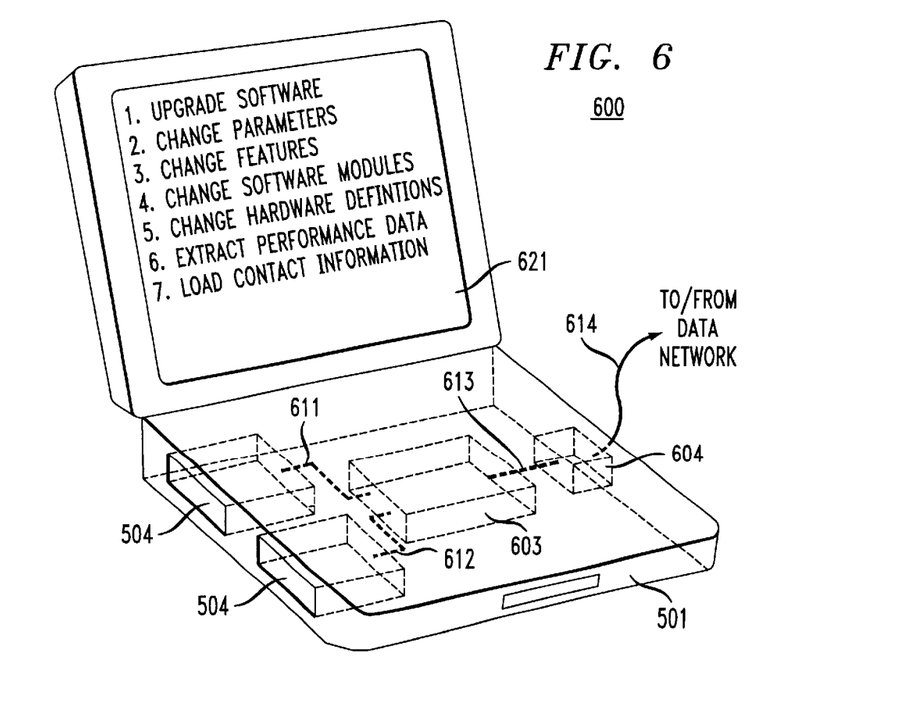
FIG. 6 depicts an isometric drawing of notebook computer 501 in accordance with the second illustrative embodiment of the present invention.

FIG. 6 depicts an isometric drawing of the salient components of notebook computer 501, which comprises: processor 603, modem 604, infrared transceiver 504, wireline transceiver 507, modem 614, and display 621, interconnected as shown.

Computer 501 is a notebook computer, as is well-known in the art, and provides the functionality described in this specification and in the drawings. Although only the wire frame and some components of computer 501 are depicted in FIG. 6, computer 501 advantageously also comprises: a keyboard, a pointing device for a graphical user interface (e.g., a mouse, a touchpad, etc.), a CD-ROM/DVD drive, a power supply, a hard drive, a speaker, and a microphone, in well-known fashion. Because these components are all well-known to those skilled in the art, they are not shown in FIG. 6 so that the following discussion can focus on those components that are most germane to an understanding of the present invention.

Furthermore, although computer 501 is depicted in FIG. 6 as having a clamshell-notebook design, it will be clear to those skilled in the art that, in some alternative embodiments of the present invention, the size, shape, and weight of computer 501 can vary considerably and can include, for example, but without limitation, a hand-held design, a tower design, a desktop design, etc.

The heart of computer 501 is processor 603, which is advantageously a general purpose processor that is capable of directing computer 501 to perform the functionality described in this specification and in the drawings. For example, processor 603 is capable of receiving data, hardware definitions, software, software modules (e.g., .dll files, etc.), contact information, etc. from a data network via modem 614 and transmitting to wireless terminal 502 via infrared transceiver 504, wireline transceiver 507, or both, under the direction of a user of computer 501. In addition, processor 603 is capable of receiving data, hardware definitions, software, software modules (e.g., .dll files, etc.), contact information, etc. from a media (e.g., a CD-ROM, a magnetic disk, non-volitale RAM, etc.) and transmitting to wireless terminal 502 via: (1) infrared tranceiver 504, or (2) wireline transceiver 507, or (3) both, under the direction of a user of computer 201. Furthermore, processor 603 is capable of receiving data, hardware definitions, software, software modules, contact information, performance data, etc., from wireless terminal 502 via: (1) infrared tranceiver 504, or (2) wireline transceiver 507, or (3) both, and transmitting it to a data network via modem 614, under the direction of a user of computer 501.

Computer 501 advantageously comprises infrared transceiver 504 and wireline transceiver 507 for interfacing with wireless terminal 502, and communicates with wireless terminal 502 via infrared transceiver 504, wireline transceiver 507, or both. In some alternative embodiments of the present invention, computer 501 comprises just infrared transceiver 504 and communicates with wireless terminal 502 via only infrared transceiver 504. In other alternative embodiments of the present invention, computer 501 comprises just wireline transceiver 507 and communicates with wireless terminal 502 via only wireline transceiver 507. It will be clear to those skilled in the art how to make and use infrared transceiver 504 and wireline transceiver 507.

Computer 501 also advantageously comprises modem 604, which provides a connection, in well-known fashion, to a data network, such as the Internet, a local area network, a wide area network, etc. In particular, modem 604 enables computer 501 to receive information (e.g., data, hardware definitions, software, software modules, contact information, etc.) reliably from other computers via the data network and to reliably transmit data to other computers via the data network. The connection between modem 604 and the data network can be a wireline connection, wireless connection or combination of wireline and wireless connections. It will be clear to those skilled in the art how to make and use modem 604.

Display 621 is a liquid crystal display, as is well-known in the art, and aids the user of computer 501 in working with wireless terminal 502 via computer 501. It will be clear to those skilled in the art how to make and use display 621.

Figure 7:
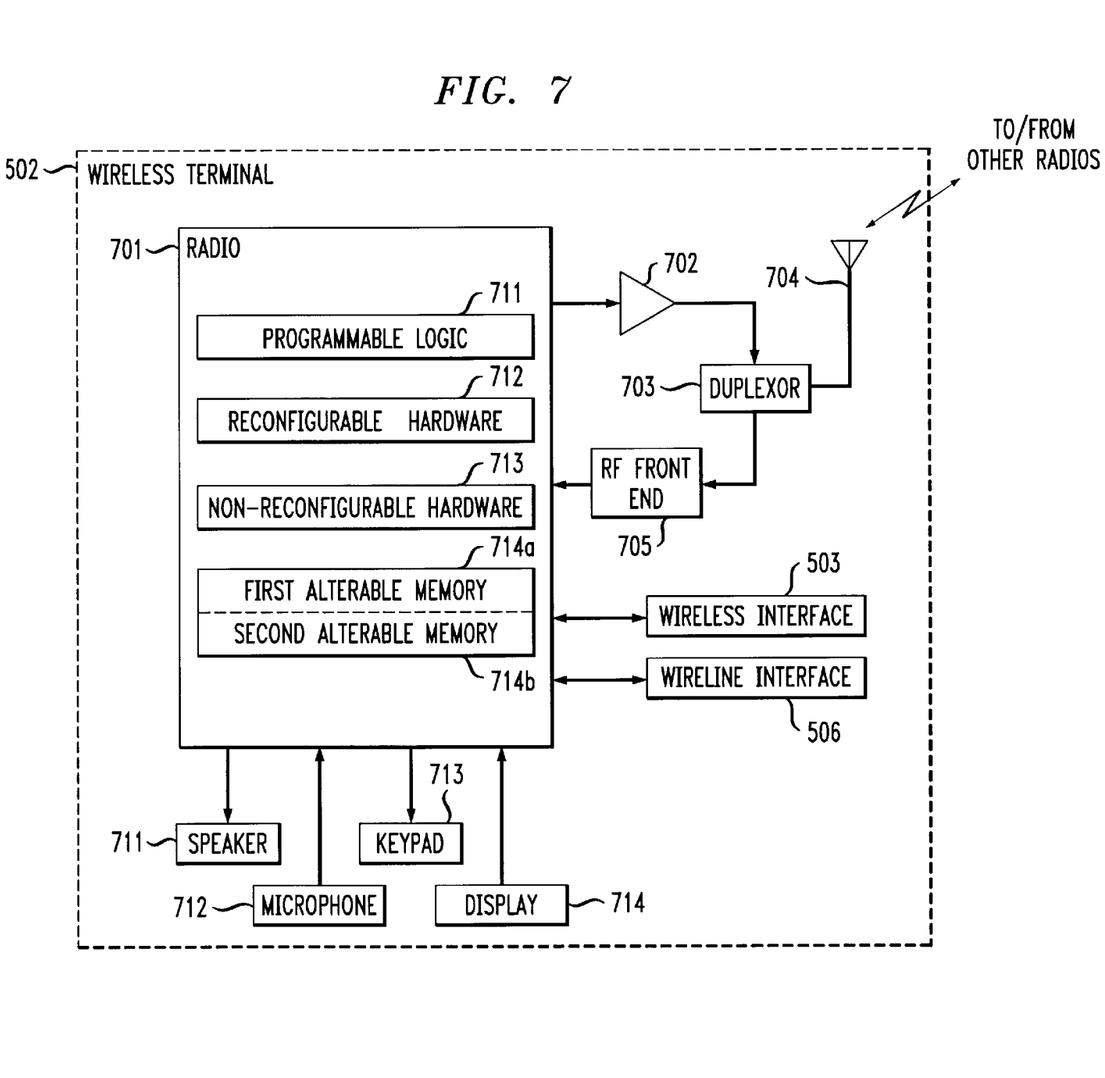
FIG. 7 depicts a block diagram of some of the components in wirless terminal 502, which is depicted in FIG. 5.

FIG. 7 depicts a block diagram of the components in wireless terminal 502. Wireless terminal 502 advantageously comprises: radio 701, radio frequency amplifier 702, duplexor 703, antenna 704, RF front end 705, wireless interface 503, wireline interface 506, speaker 711, microphone 712, display 713, and keypad 714.

Radio frequency amplifier 702, duplexor 703, antenna 704, RF front end 705, wireless interface 503, wireline interface 506, speaker 711, microphone 712, display 713, and keypad 714 are all well known to those skilled in the art and need not be discussed further.

Radio 701 comprises all of the hardware and software necessary or desirable to receive signals via microphone 712 and keypad 714 and to prepare them for transmission via antenna 304 and to receive signals via antenna 304 and to prepare them for output via speaker 711 and display 713. In all other aspects, radio 701 is advantageously identical to radio 301 described above.

The interaction of notebook computer 501 and wireless terminal 502 is advantageously analogous to that between notebook computer 101 and radio card 102 as described above and with respect to FIG. 4, and, therefore, need not be described further.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:
    (1) a radio card comprising:
        (a) a first alterable memory for storing a first plurality of instructions,
        (b) a radio comprising programmable logic for executing said first plurality of instructions, and
        (c) a first wireline radio card interface for receiving said first plurality of instructions; and
    (2) a computer comprising:
        (a) a modem for for receiving said first plurality of instructions via a data network, and
        (b) a second wireline radio card interface for providing said first plurality of instructions to said radio card for storage in said first alterable memory.

2. The apparatus of claim 1:
    wherein said radio card further comprises:
        (d) reconfigurable hardware that is defined by a hardware definition, and
        (e) a second alterable memory for storing said hardware definition;
    wherein said modem also receives said hardware definition via said data network; and
    wherein said second wireline radio card interface also provides said hardware definition to said radio card for storage in said second alterable memory.

3. The apparatus of claim 2 wherein said plurality of instructions and said hardware definition enable said radio to communicate with a wireless code division multiple access telecommunications system.

4. The apparatus of claim 2 wherein said plurality of instructions and said hardware definition enable said radio to communicate with a wireless time division multiple access telecommunications system.

5. The apparatus of claim 1 wherein said modem also receives a second plurality of instructions via said data network; and wherein said second wireline radio card interface also provides said second plurality of instructions to said radio card to replace said first plurality of instructions in said first alterable memory.

6. The apparatus of claim 1 wherein said radio card has a Personal Computer Memory Card Industry Association form factor.

7. The apparatus of claim 1 wherein said radio card provides a wireless telecommunications link for said computer to said data network.

8. The apparatus of claim 1 wherein said first alterable memory and said second alterable memory are the same.

9. The apparatus of claim 1:
    wherein said radio card further comprises:
        (d) a second alterable memory for storing a plurality of names and associated telephone numbers; and
    wherein said second wireline radio card interface also provides said plurality of names and associated telephone numbers to said radio card for storage in said second alterable memory.

10. The apparatus of claim 9 wherein said modem also receives said plurality of names and associated telephone numbers via said data network.

11. The apparatus of claim 1:
    wherein said radio card compiles performance data on the efficacy of a wireless telecommunications link;
    wherein said first wireline radio card interface is also for providing said performance data to said computer; and
    wherein said modem is also for providing said performance data to a remote computer via said data network.

12. An apparatus comprising:
    (1) a radio card comprising:
        (a) a first alterable memory for storing a first hardware definition,
        (b) a radio comprising reconfigurable hardware that is defined by a first hardware definition, and
        (c) a first wireline radio card interface for receiving said first hardware definition; and
    (2) a computer comprising:
        (a) a modem for receiving said first hardware definition via a data network, and
        (b) a second wireline radio card interface for providing said first hardware definition to said radio card for storage in said first alterable memory.

13. The apparatus of claim 12:
    wherein said radio card further comprises:
        (d) a second alterable memory for storing a first plurality of instructions, and
        (e) programmable logic that executes said first plurality of instructions; and
    wherein said modem also receives said first plurality of instructions via said data network; and
    wherein said second wireline radio card interface also provides said first plurality of instructions to said radio card for storage in said second alterable memory.

14. The apparatus of claim 12 wherein said plurality of instructions and said hardware definition enable said radio to communicate with a wireless code division multiple access telecommunications system.

15. The apparatus of claim 12 wherein said plurality of instructions and said hardware definition enable said radio to communicate with a wireless time division multiple access telecommunications system.

16. The apparatus of claim 12 wherein said modem also receives a second hardware definition via said data network; and wherein said second wireline radio card interface also provides said second hardware definition to said radio card to replace said first hardware definition in said first alterable memory.

17. The apparatus of claim 12 wherein said radio card provides a wireless telecommunications link for said computer to said data network.

18. The apparatus of claim 12 wherein said first alterable memory and said second alterable memory are the same.

19. The apparatus of claim 12 wherein said radio card compiles performance data on the efficacy of a wireless telecommunications link;
    wherein said first wireline radio card interface is also for providing said performance data to said computer; and wherein said modem is also for providing said performance data to a remote computer via said data network.

20. The apparatus of claim 12:
wherein said radio card further comprises:
(d) a second alterable memory for storing a plurality of names and associated telephone numbers; and
wherein said second wireline radio card interface also provides said plurality of names and associated telephone numbers to said radio card for storage in said second alterable memory.

21. An apparatus comprising:
(1) a wireless terminal comprising:
(a) a first alterable memory for storing a first plurality of instructions,
(b) a radio comprising programmable logic for executing said first plurality of instructions, and
(c) a first wireless transceiver for receiving said first plurality of instructions; and
(2) a computer comprising:
(a) a modem for receiving said first plurality of instructions via a data network, and
(b) a second wireless transceiver for providing said first plurality of instructions to said wireless terminal for storage in said first alterable memory.

22. The apparatus of claim 21:
wherein said wireless terminal further comprises:
(d) reconfigurable hardware that is defined by a hardware definition, and
(e) a second alterable memory for storing said hardware definition;
wherein said modem also receives said hardware definition via said data network; and
wherein said second wireless transceiver also provides said hardware definition to said wireless terminal for storage in said second alterable memory.

23. The apparatus of claim 22 wherein said plurality of instructions and said hardware definition enable said radio to communicate with a wireless code division multiple access telecommunications system.

24. The apparatus of claim 22 wherein said plurality of instructions and said hardware definition enable said radio to communicate with a wireless time division multiple access telecommunications system.

25. The apparatus of claim 21 wherein said modem also receives a second plurality of instructions via said data network; and wherein said second wireless transceiver also provides said second plurality of instructions to said wireless terminal to replace said first plurality of instructions in said first alterable memory.

26. The apparatus of claim 21 wherein said first wireless transceiver is an infrared transceiver.

27. The apparatus of claim 21 wherein said wireless terminal provides a wireless telecommunications link for said computer to said data network.

28. The apparatus of claim 21 wherein said first alterable memory and said second alterable memory are the same.

29. The apparatus of claim 21:
wherein said wireless terminal further comprises:
(d) a second alterable memory for storing a plurality of names and associated telephone numbers; and
wherein said second wireless transceiver also provides said plurality of names and associated telephone numbers to said wireless terminal for storage in said second alterable memory.

30. The apparatus of claim 29 wherein said modem also receives said plurality of names and associated telephone numbers via said data network.

31. The apparatus of claim 21:
wherein said wireless terminal compiles performance data on the efficacy of a wireless telecommunications link;
wherein said first wireless transceiver is also for providing said performance data to said computer; and
wherein said modem is also for providing said performance data to a remote computer via said data network.

32. An apparatus comprising:
(1) a wireless terminal comprising:
(a) a first alterable memory for storing a first hardware definition,
(b) a radio comprising reconfigurable hardware that is defined by a first hardware definition, and
(c) a first wireline transceiver for receiving said first hardware definition; and
(2) a computer comprising:
(a) a modem for receiving said first hardware definition via a data network, and
(b) a second wireline transceiver for providing said first hardware definition to said wireless terminal for storage in said first alterable memory.

33. The apparatus of claim 32:
wherein said wireless terminal further comprises:
(d) a second alterable memory for storing a first plurality of instructions, and
(e) programmable logic that executes said first plurality of instructions; and
wherein said modem also receives said first plurality of instructions via said data network; and
wherein said second wireline transceiver also provides said first plurality of instructions to said wireless terminal for storage in said second alterable memory.

34. The apparatus of claim 32 wherein said plurality of instructions and said hardware definition enable said radio to communicate with a wireless code division multiple access telecommunications system.

35. The apparatus of claim 32 wherein said plurality of instructions and said hardware definition enable said radio to communicate with a wireless time division multiple access telecommunications system.

36. The apparatus of claim 32:
wherein said modem also receives a second hardware definition via said data network; and
wherein said second wireline transceiver also provides said second hardware definition to said wireless terminal to replace said first hardware definition in said first alterable memory.

37. The apparatus of claim 32 wherein said wireless terminal provides a wireless telecommunications link for said computer to said data network.

38. The apparatus of claim 32 wherein said first alterable memory and said second alterable memory are the same.

39. The apparatus of claim 32 wherein said wireless terminal compiles performance data on the efficacy of a wireless telecommunications link;
wherein said first wireline transceiver is also for providing said performance data to said computer; and
wherein said modem is also for providing said performance data to a remote computer via said data network.

40. The apparatus of claim 32:
wherein said wireless terminal further comprises:
(d) a second alterable memory for storing a plurality of names and associated telephone numbers; and
wherein said second wireline transceiver also provides said plurality of names and associated telephone numbers to said wireless terminal for storage in said second alterable memory.

* * * * *